US011034219B2

(12) United States Patent
Thurgate et al.

(10) Patent No.: US 11,034,219 B2
(45) Date of Patent: Jun. 15, 2021

(54) VEHICLE DOORS INCLUDING TORSION BAR SUPPORT ASSEMBLIES AND METHODS FOR ASSEMBLING THE SAME

(71) Applicant: Toyota Motor Engineering & Manufacturing North America, Inc., Plano, TX (US)

(72) Inventors: Brian T. Thurgate, Ypsilanti, MI (US); William A. Hardy, Tecumseh, MI (US); Kevin O'Beirne, Northville, MI (US); Johnny Rose, Ypsilanti, MI (US); Wasim Ukra, Canton, MI (US); Rajesh Chennagowni, Ann Arbor, MI (US); Herb Meingast, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 155 days.

(21) Appl. No.: 16/257,777

(22) Filed: Jan. 25, 2019

(65) Prior Publication Data
US 2020/0238801 A1      Jul. 30, 2020

(51) Int. Cl.
*B60J 5/10* (2006.01)
*B62D 27/02* (2006.01)
(Continued)

(52) U.S. Cl.
CPC ............ *B60J 5/107* (2013.01); *B62D 27/023* (2013.01); *B62D 29/043* (2013.01); *B62D 25/08* (2013.01)

(58) Field of Classification Search
CPC ..... B60J 5/10; B60J 5/101; B60J 5/107; B60J 5/0426; B60J 5/0423; B60J 5/0402;
(Continued)

(56) References Cited

U.S. PATENT DOCUMENTS

RE31,063 E     10/1982   Greiner et al.
6,402,163 B1    6/2002   Pratt
(Continued)

FOREIGN PATENT DOCUMENTS

JP      2006027486 A    2/2006
JP         4135363 B2    8/2008
KR       101198665 B1   11/2012

*Primary Examiner* — Gregory A Blankenship
(74) *Attorney, Agent, or Firm* — Dinsmore & Shohl, LLP

(57) ABSTRACT

A vehicle door includes an inner panel including an upper portion defining a window aperture, and a lower portion positioned opposite the upper portion in a vertical direction, and a support assembly coupled to the inner panel, the support assembly including a first torsion member extending along the upper portion of the inner panel in a lateral direction that is transverse to the vertical direction, the first torsion member defining holes extending through the first torsion member, a second torsion member extending along the upper portion of the inner panel toward the first torsion member, the second torsion member defining holes that are aligned with the holes of the first torsion member, and at least one fastener positioned in corresponding aligned holes of the first torsion member and the second torsion member, the at least one fastener coupling the first torsion member to the second torsion member.

19 Claims, 10 Drawing Sheets

(51) Int. Cl.
*B62D 29/04* (2006.01)
*B62D 25/08* (2006.01)

(58) Field of Classification Search
CPC ..... B60J 5/0405; B60J 5/0411; B62D 27/023; B62D 29/043
USPC ..................................................... 296/146.8
See application file for complete search history.

(56) References Cited

U.S. PATENT DOCUMENTS

| | | | |
|---|---|---|---|
| 9,981,534 | B2 | 5/2018 | Dassen et al. |
| 10,717,349 | B1 * | 7/2020 | Thurgate .............. B62D 29/043 |
| 10,723,209 | B2 * | 7/2020 | Chiba ..................... B60J 5/102 |
| 2016/0114661 | A1 * | 4/2016 | Yamaguchi .............. B60J 5/102 |
| | | | 296/146.2 |
| 2016/0185193 | A1 * | 6/2016 | Kamimura ............... B60J 5/102 |
| | | | 52/309.1 |
| 2016/0236723 | A1 * | 8/2016 | Ikeda ..................... B62D 25/08 |
| 2016/0347155 | A1 * | 12/2016 | Kuntze ................ B62D 29/043 |
| 2017/0174059 | A1 * | 6/2017 | Miyake ................. E05D 5/0207 |
| 2018/0111456 | A1 * | 4/2018 | Hofer ..................... B60J 5/107 |
| 2019/0184798 | A1 * | 6/2019 | Chiba .................... B60J 5/0481 |
| 2019/0184799 | A1 * | 6/2019 | Kerschbaum ..... B29C 45/14336 |
| 2019/0217690 | A1 * | 7/2019 | Chiba ..................... B60J 5/101 |
| 2020/0009948 | A1 * | 1/2020 | Ikeda ..................... B60J 5/101 |
| 2020/0094658 | A1 * | 3/2020 | Miyake ................... B60J 5/107 |
| 2020/0164929 | A1 * | 5/2020 | Kuntze ................ B62D 29/048 |
| 2020/0238801 | A1 * | 7/2020 | Thurgate ................. B60J 5/107 |
| 2020/0238802 | A1 * | 7/2020 | Thurgate .............. B62D 29/043 |

* cited by examiner

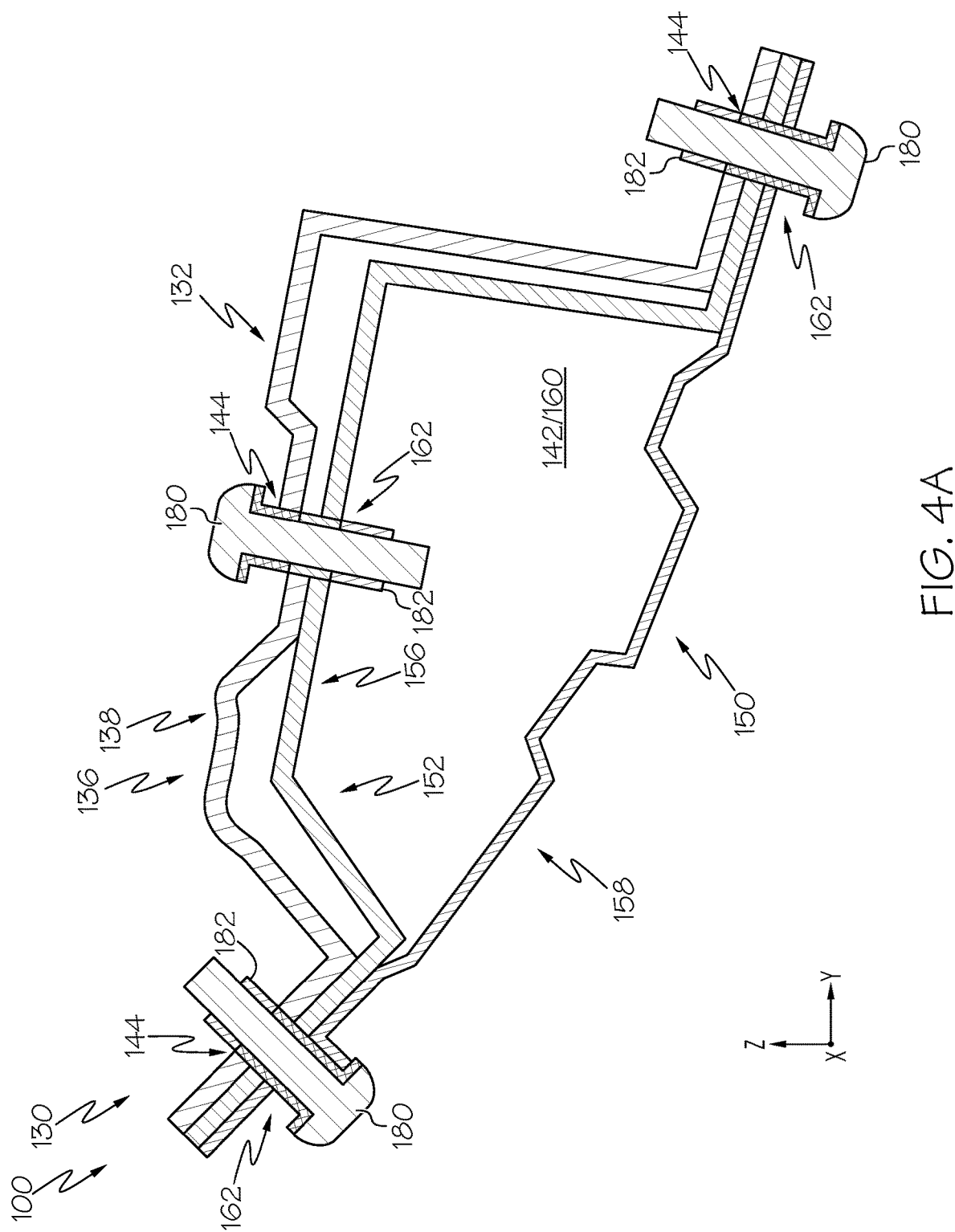

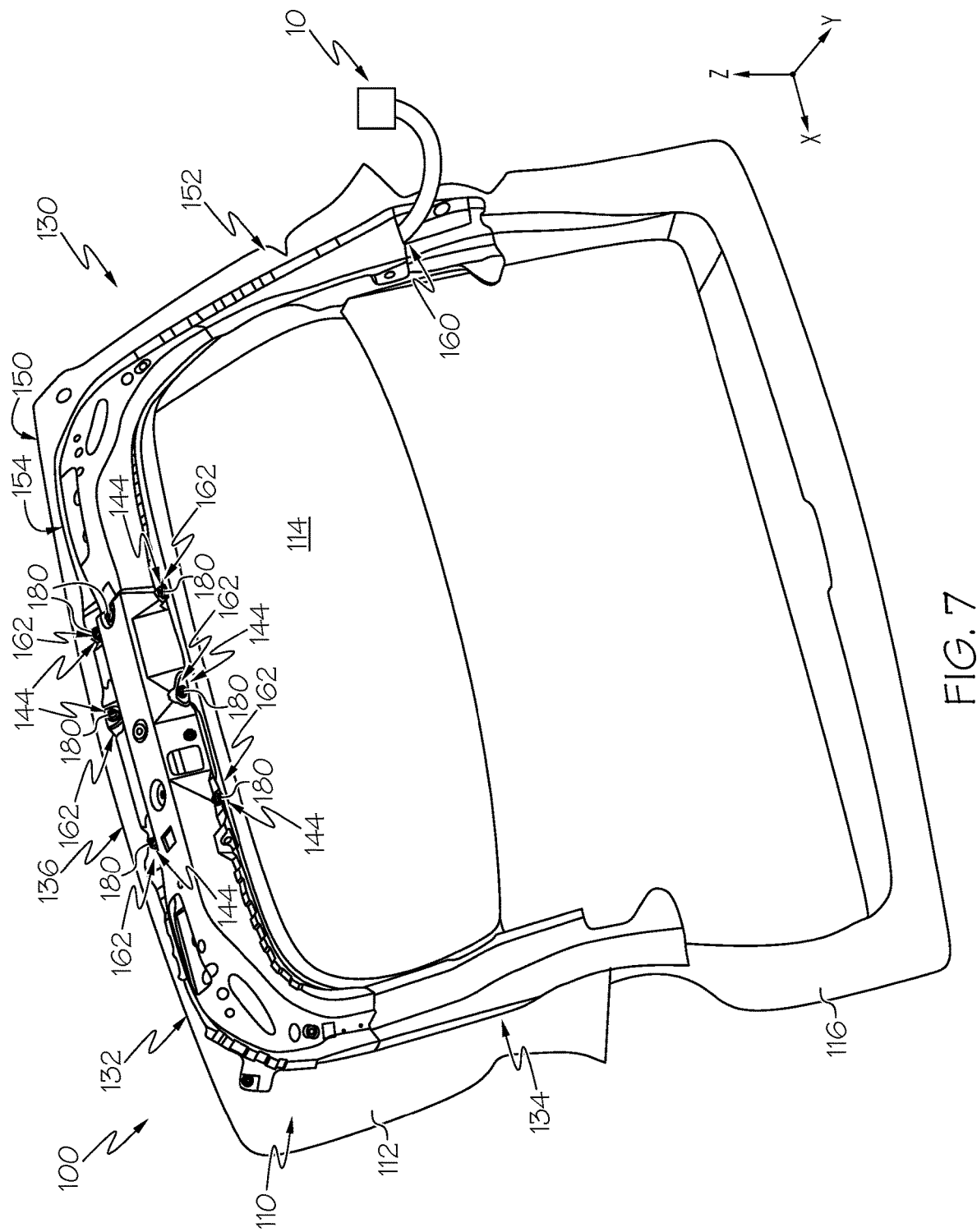

VEHICLE DOORS INCLUDING TORSION BAR SUPPORT ASSEMBLIES AND METHODS FOR ASSEMBLING THE SAME

TECHNICAL FIELD

The present specification generally relates to vehicle door assemblies and, more specifically, vehicle door assemblies including torsion bar support assemblies and methods for assembling the same.

BACKGROUND

Some vehicles include doors formed from a lightweight material, such as a polymer resin, a urethane resin, acrylic, or the like. Doors formed from lightweight materials may be generally lighter than doors formed from steel or aluminum, which may assist in lowering the overall weight of the vehicle and improving the vehicle's efficiency (e.g., fuel efficiency). However, doors formed from lightweight materials may be generally less rigid than doors formed from steel and aluminum, and the doors may elastically deform under forces under which a conventional door made of steel or aluminum would remain rigid. In larger vehicles including larger doors, elastic deformation resulting from torsional forces acting on the door may be amplified.

Accordingly, a need exists for structures to increase the rigidity of vehicle doors.

SUMMARY

In one embodiment, a vehicle door includes an inner panel including an upper portion defining a window aperture, and a lower portion positioned opposite the upper portion in a vertical direction, and a support assembly coupled to the inner panel, the support assembly including a first torsion member extending along the upper portion of the inner panel in a lateral direction that is transverse to the vertical direction, the first torsion member defining holes extending through the first torsion member, a second torsion member extending along the upper portion of the inner panel toward the first torsion member, the second torsion member defining holes that are aligned with the holes of the first torsion member, and at least one fastener positioned in corresponding aligned holes of the first torsion member and the second torsion member, the at least one fastener coupling the first torsion member to the second torsion member.

In another embodiment, a method for assembling a vehicle door including positioning a second torsion member on an inner panel, the inner panel including an upper portion defining a window aperture and a lower portion positioned opposite the upper portion in a vertical direction, where the second torsion member extends along the upper portion in a lateral direction that is transverse to the vertical direction, positioning a first torsion member on the inner panel opposite the second torsion member in the lateral direction, where the first torsion member extends along the upper portion of the inner panel toward the second torsion member in the lateral direction, aligning a hole defined by the first torsion member with a hole defined by the second torsion member, and securing the first torsion member to the second torsion member with a fastener positioned through the hole of the first torsion member and the hole of the second torsion member.

In another embodiment, a vehicle door includes an inner panel including an upper portion, and a lower portion positioned opposite the upper portion in a vertical direction, and a support assembly coupled to the inner panel, the support assembly including a pair of torsion members extending along the upper portion of the inner panel in a lateral direction that is transverse to the vertical direction, the pair of torsion members overlapping one another in the lateral direction and including aligned holes extending through each of the pair of torsion members, and at least one fastener positioned in corresponding aligned holes of the pair of torsion members, where the aligned holes and the at least one fastener are sized to selectively allow lateral movement of the pair of torsion members with respect to one another in the lateral direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4A schematically depicts a section view of the support assembly along section 4A-4A of FIG. 3, according to one or more embodiments shown and described herein;

FIG. 7 schematically depicts the inner panel and the torsion member of FIG. 5 coupled to another torsion member to form the support assembly, according to one or more embodiments shown and described herein.

DETAILED DESCRIPTION

Embodiments described herein are generally related to vehicle doors including support assemblies. Vehicle doors may be formed from resins or other lightweight materials to reduce the overall weight of a vehicle, which may assist in improving the efficiency of the vehicle (e.g., fuel economy).

However, doors formed with resins and other lightweight materials may be more susceptible to elastic deformation than doors formed from steel or aluminum, and may elastically deform when being manipulated by a user, for example when being opened or closed to provide ingress to and egress from the vehicle. Elastic deformation of doors formed with resins and other lightweight materials may lead to customer dissatisfaction.

Vehicle doors described herein generally include an inner panel and a support assembly including a first torsion member that is coupled to a second torsion member. The first torsion member and the second torsion member extend toward one another over an upper portion of the inner panel, and each of the first torsion member and the second torsion member define holes extending through the first torsion member and the second torsion member, respectively. In embodiments, at least one fastener is positioned within aligned holes of the first torsion member and the second torsion member to couple the first torsion member to the second torsion member. The holes of the first torsion member and/or the second torsion member are sized to selectively allow lateral movement of the first torsion member with respect to the second torsion member, in embodiments. By moving the first torsion member and the second torsion member with respect to one another in the lateral direction, a span of the support assembly may be adjusted to accommodate variations in the size of the inner panel, for example as may result from manufacturing tolerances. Furthermore, in some embodiments, electronic accessory wires may be routed through the first torsion member and/or the second torsion member before the first and second torsion members are assembled to one another. By routing accessory wires through the first torsion member and/or the second torsion member before they are assembled to one another, the routing of the accessory wires may be simplified, as compared to configurations including monolithically formed support assemblies. These and other embodiments will now be described with specific reference to the appended drawings.

Figure 1:
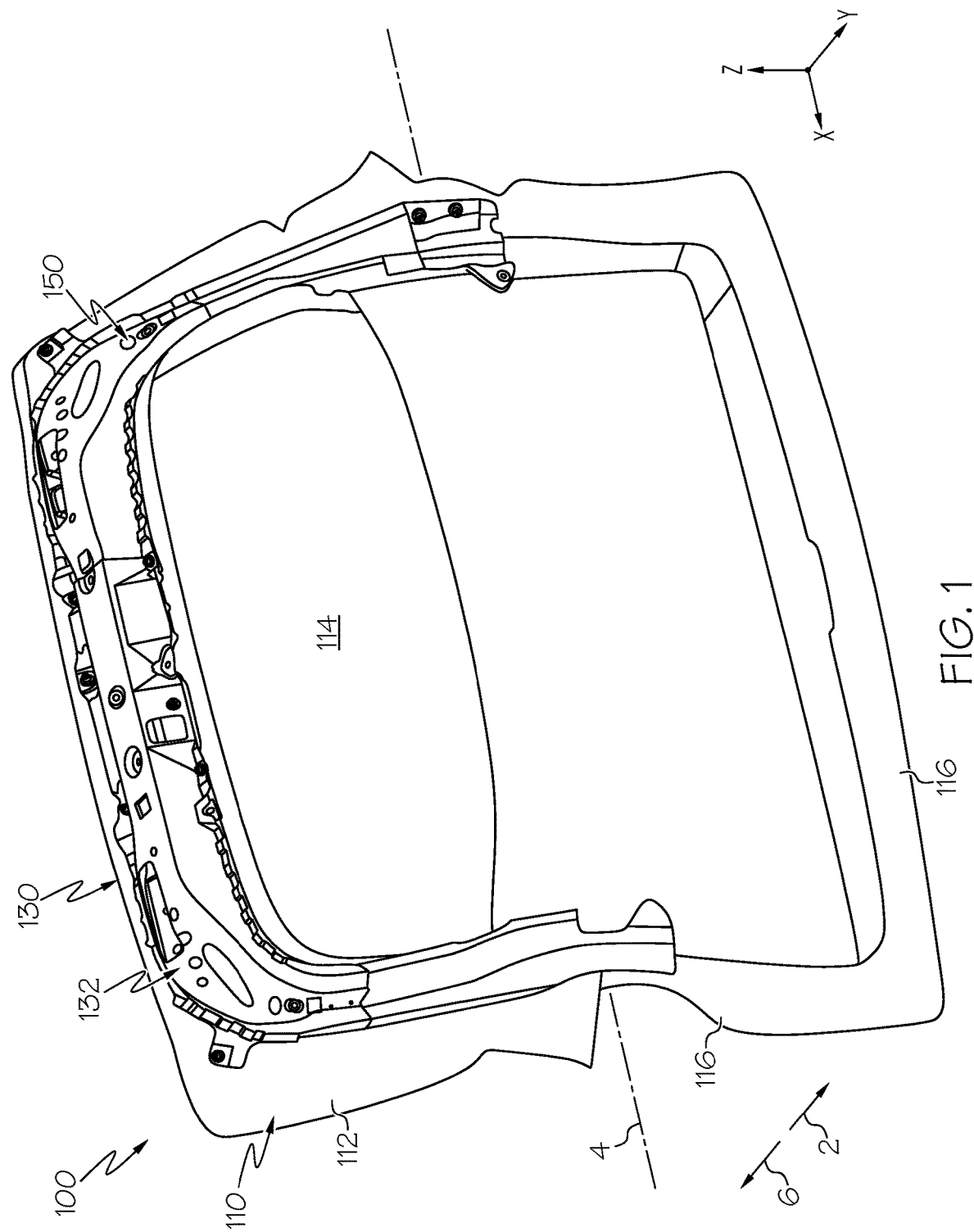
FIG. 1 schematically depicts perspective view of an inner panel of a vehicle door and a support assembly, according to one or more embodiments shown and described herein.

As used herein, the term "longitudinal direction" refers to the forward-rearward direction of components of the vehicle door (i.e., in the +/−Y-direction depicted in FIG. 1). The term "lateral direction" refers to the cross-wise direction of components of the vehicle door (i.e., in the +/−X-direction depicted in FIG. 1), and is transverse to the longitudinal direction. The term "vertical direction" refers to the upward-downward direction of components of the vehicle door (i.e., in the +/−Z-direction depicted in FIG. 1). Further, the terms "inboard," "inward," "outboard," and "outward" are used to describe the relative positioning of various components of the vehicle door in directions referencing a vehicle centerline 4 that bisects the vehicle in the longitudinal direction. Referring to FIG. 1, the terms "outboard" or "outward" describe the relative location of a component in direction 2 with reference to the vehicle centerline 4. The term "inboard" or "inward" as used herein describes the relative location of a component in direction 6 with reference to the vehicle centerline 4.

Referring initially to FIG. 1, a vehicle door 100 is schematically depicted. In the illustrated example, vehicle door 100 is a rear door that may be assembled to vehicle as an upward-opening door (e.g., a door that is coupled to a vehicle body at a top edge of the door and opens by rotating about the X-direction as depicted). However, it should be understood that the vehicle door 100 may also be a side-opening door (e.g., a door that is coupled to a vehicle body at a lateral edge of the door and opens by rotating about the Z-direction as depicted).

The vehicle door 100 generally includes an inner panel 110 including an upper portion 112 and a lower portion 116 positioned opposite the upper portion 112 in the vertical direction. When assembled, an outer fascia may be positioned outboard of and coupled to the inner panel 110 to form the vehicle door 100. The upper portion 112 generally defines a window aperture 114 extending through the upper portion 112 of the inner panel 110 and through which a window may be positioned. In embodiments, the inner panel 110 may be formed of a resin, such as a polymer, urethane, acrylic, or the like. Without being bound by theory, the inner panel 110, and accordingly the vehicle door 100, may be lighter than vehicle doors that are formed from metals, such as steel or aluminum in embodiments in which the inner panel 110 is formed with a resin. By reducing the weight of the vehicle door 100, vehicle efficiency (e.g., fuel efficiency) may be increased. However, resin may be more flexible than steel or aluminum, and vehicle doors 100 formed from resin may be susceptible to elastic deformation, for example, as a user opens or closes the vehicle door 100.

In embodiments, the vehicle door 100 includes a support assembly 130 coupled to the inner panel 110, the support assembly 130 including a first torsion member 132 coupled to a second torsion member 150. The support assembly 130 generally increases the rigidity of the vehicle door 100 to resist elastic deformation of the vehicle door 100.

The first torsion member 132 extends along the upper portion 112 of the inner panel 110 in the lateral direction toward the second torsion member 150. In the embodiment depicted in FIG. 1, the first torsion member 132 extends along the upper portion 112 above the window aperture 114. Similarly, the second torsion member 150 extends along the upper portion 112 of the inner panel 110 in the lateral direction toward the first torsion member 132. In the embodiment depicted in FIG. 1, the second torsion member 150 extends along the upper portion 112 above the window aperture 114.

Figure 2:
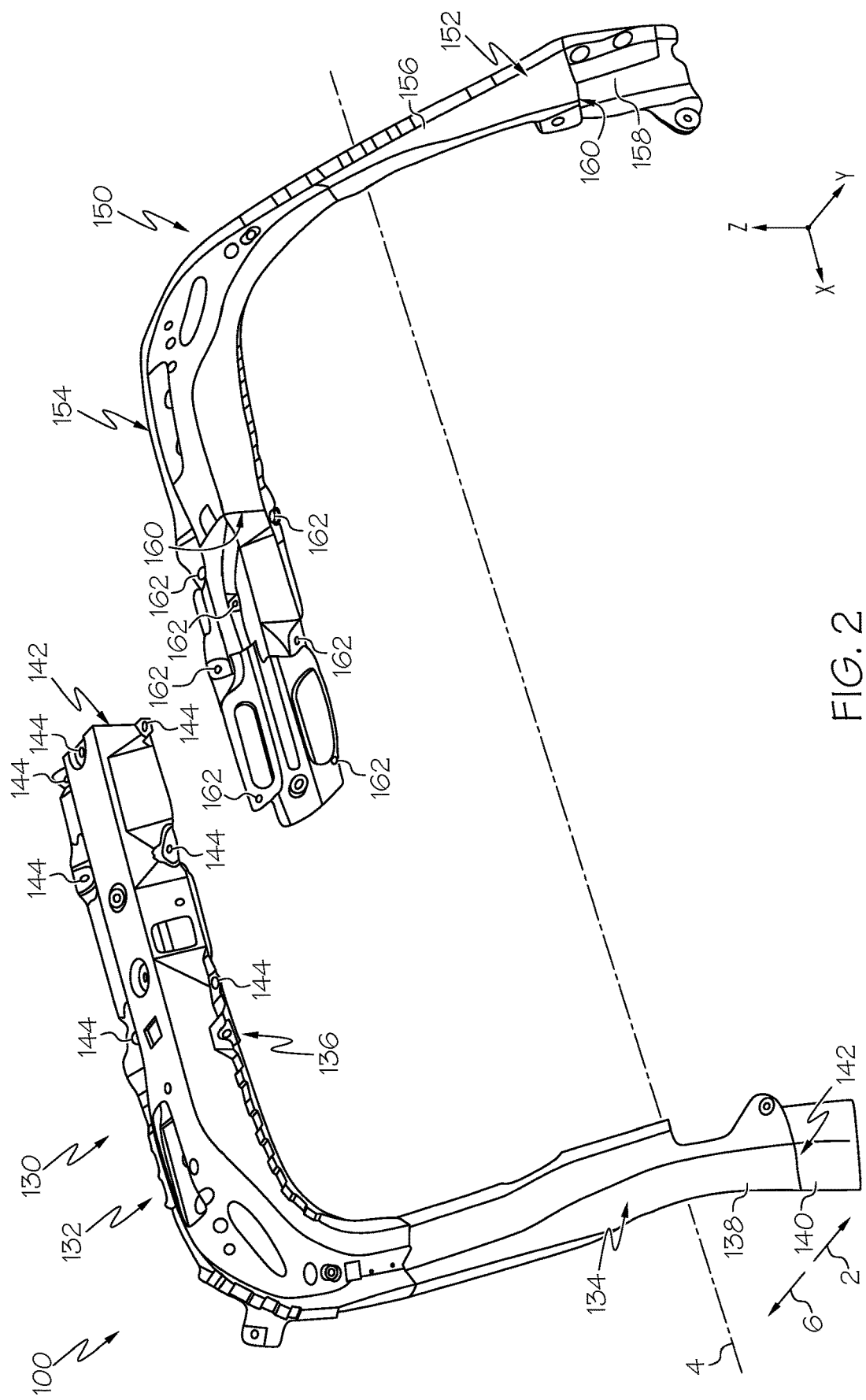
FIG. 2 schematically depicts an exploded view of the support assembly of FIG. 1, according to one or more embodiments shown and described herein.

Referring to FIG. 2, a perspective exploded view of the support assembly 130 is schematically depicted. The first torsion member 132 includes a first vertical portion 134 extending in the vertical direction and a first lateral portion 136 extending in the lateral direction. In the embodiment depicted in FIG. 2, the first lateral portion 136 is positioned above the first vertical portion 134 in the vertical direction. When installed to the inner panel 110 (FIG. 1), the first lateral portion 136 is positioned above the window aperture 114 (FIG. 1), and the first vertical portion 134 extends downward from the first lateral portion 136. In embodiments, the first vertical portion 134 extends between the upper portion 112 (FIG. 1) of the inner panel 110 (FIG. 1) to the lower portion 116 (FIG. 1) of the inner panel 110. For example, in some embodiments, the first vertical portion 134 extends across at least 25% of the inner panel 110 (FIG. 1) evaluated in the vertical direction. In some embodiments, the first vertical portion 134 extends across at least 50% of the inner panel 110 (FIG. 1) evaluated in the vertical direction. In some embodiments, the first vertical portion 134 extends across at least 75% of the inner panel 110 (FIG. 1) evaluated in the vertical direction. By extending along a comparatively significant portion of the inner panel 110 (FIG. 1) evaluated in the vertical direction, the first vertical portion 134 may assist in resisting torsional forces applied to the vehicle door 100, thereby increasing the rigidity of the vehicle door 100.

The second torsion member 150 includes a second vertical portion 152 extending in the vertical direction and a second lateral portion 154 extending in the lateral direction. Like the first torsion member 132, in embodiments, the second lateral portion 154 is positioned above the window aperture 114 (FIG. 1) when the second torsion member 150 is installed to the inner panel 110 (FIG. 1), and the second vertical portion 152 extends downward from the second lateral portion 154. When assembled, the first lateral portion 136 and the second lateral portion 154 are oriented to extend toward one another in the lateral direction.

In embodiments, the second vertical portion 152 extends between the upper portion 112 (FIG. 1) of the inner panel 110 (FIG. 1) to the lower portion 116 (FIG. 1) of the inner panel 110. For example, in some embodiments, the second vertical portion 152 extends across at least 25% of the inner panel 110 (FIG. 1) evaluated in the vertical direction. In some embodiments, the second vertical portion 152 extends across at least 50% of the inner panel 110 (FIG. 1) evaluated in the vertical direction. In some embodiments, the second vertical portion 152 extends across at least 75% of the inner panel 110 (FIG. 1) evaluated in the vertical direction. By extending along a comparatively significant portion of the inner panel 110 (FIG. 1) evaluated in the vertical direction, the second vertical portion 152 may assist in resisting torsional forces applied to the vehicle door 100, thereby increasing the rigidity of the vehicle door 100.

In embodiments, the first torsion member 132 includes a first outer member 138 and a first inner member 140 positioned inboard of the first outer member 138 in the longitudinal direction. The first outer member 138 and the first inner member 140 generally define a first inner cavity 142 that extends along the first torsion member 132. Similarly, in embodiments, the second torsion member 150 includes a second outer member 156 and a second inner member 158 positioned inboard of the second outer member 156 in the longitudinal direction. The second outer member 156 and the second inner member 158 generally define a second inner cavity 160 that extends along the second torsion member 150. In embodiments, the first outer member 138 and the first inner member 140 are separately formed and are coupled to one another in a suitable manner, such as and without limitation, welding, brazing, structural adhesives, mechanical fasteners, or the like. Similarly, in embodiments, the second outer member 156 and the second inner member 158 are separately formed and are coupled to one another in a suitable manner, such as and without limitation, welding, brazing, structural adhesives, mechanical fasteners, or the like. The first outer member 138, first inner member 140, the second outer member 156, and the second inner member 158 may be formed of any suitable material, such as steel, aluminum, or the like, and may be formed through any suitable process, such as stamping, forging, or the like.

In some embodiments, the first outer member 138 and the first inner member 140 are monolithic, and/or the second outer member 156 and the second inner member 158 are monolithic. In these embodiments, the first torsion member 132 and the second torsion member 150 may be formed from an extrusion process, an additive manufacturing process or the like, and may be formed of any suitable material, such as steel, aluminum, or the like.

The first and second inner cavities 142, 160 of the first and second torsion members 132, 150, respectively, generally influence a cross-sectional area of the first and second torsion members 132, 150 as evaluated in the X-Y plane at the first and second vertical portions 134, 152, and as evaluated in the Y-Z plane at the first and second lateral portions 136, 154. The size and shape of the first and second inner cavities 142, 160 may be selected such that the cross-sectional area of the first and second torsion members 132, 150 is as high as practicable to fit within the vehicle door 100 (e.g., between the inner panel 110 (FIG. 1) and an outer fascia positioned outboard of the inner panel 110). Without being bound by theory, by selecting the size and shape of the first and second inner cavities 142, 160 to increase the cross-section area of the first and second torsion members 132, 150, the section modulus of the first and second torsion members 132, 150 may be increased. By increasing the section modulus of the first and second torsion members 132, 150, the rigidity of the first and second torsion members 132, 150 may be increased, which may assist in resisting torsional forces applied to the vehicle door 100. Additionally, by including the first and second inner cavities 142, 160, the rigidity of the first and second torsion members 132, 150 may be increased while maintaining a comparatively low overall weight, as compared to torsion members that are solidly formed.

In embodiments, the first torsion member 132 generally defines at least one hole 144 extending through the first torsion member 132, and the second torsion member 150 includes at least one hole 162 extending through the second torsion member 150. In the embodiment depicted in FIG. 2, the first torsion member 132 defines a plurality of holes 144 and the second torsion member 150 defines a plurality of holes 162 that may be aligned with the plurality of holes 144 of the first torsion member 132. In embodiments, mechanical fasteners may be passed through the plurality of holes 144 and of the first torsion member 132 and through corresponding aligned holes of the plurality of holes 162 of the second torsion member 150 to couple the first torsion member 132 to the second torsion member 150. Holes of the plurality of holes 144 of the first torsion member 132, in embodiments, are positioned at various locations on the first lateral portion 136. For example, in the embodiment depicted in FIG. 2, the plurality of holes 144 are positioned at perimeter locations along the first lateral portion 136 (e.g., at locations above and below the first inner cavity 142). In some embodiments, one or more of the holes of the plurality of holes 144 are positioned at a medial portion along the first lateral portion 136 (e.g., over and/or through the first inner cavity 142). Similarly, in embodiments, holes of the plurality of holes 162 of the second torsion member 150 are positioned at various locations on the second lateral portion 154. For example, in the embodiment depicted in FIG. 2, the plurality of holes 162 are positioned at perimeter locations along the second lateral portion 154 (e.g., at locations above and below the second inner cavity 160). In some embodiments, one or more of the holes of the plurality of holes 162 are positioned at a medial portion along the second lateral portion 154 (e.g., over and/or through the second inner cavity 160). While in the embodiment depicted in FIG. 2, the first torsion member 132 includes seven (7) holes 144 and the second torsion member 150 includes seven (7) corresponding holes 162, it should be understood that the first torsion member 132 and the second torsion member 150 may include any suitable number of corresponding holes.

Figure 3:
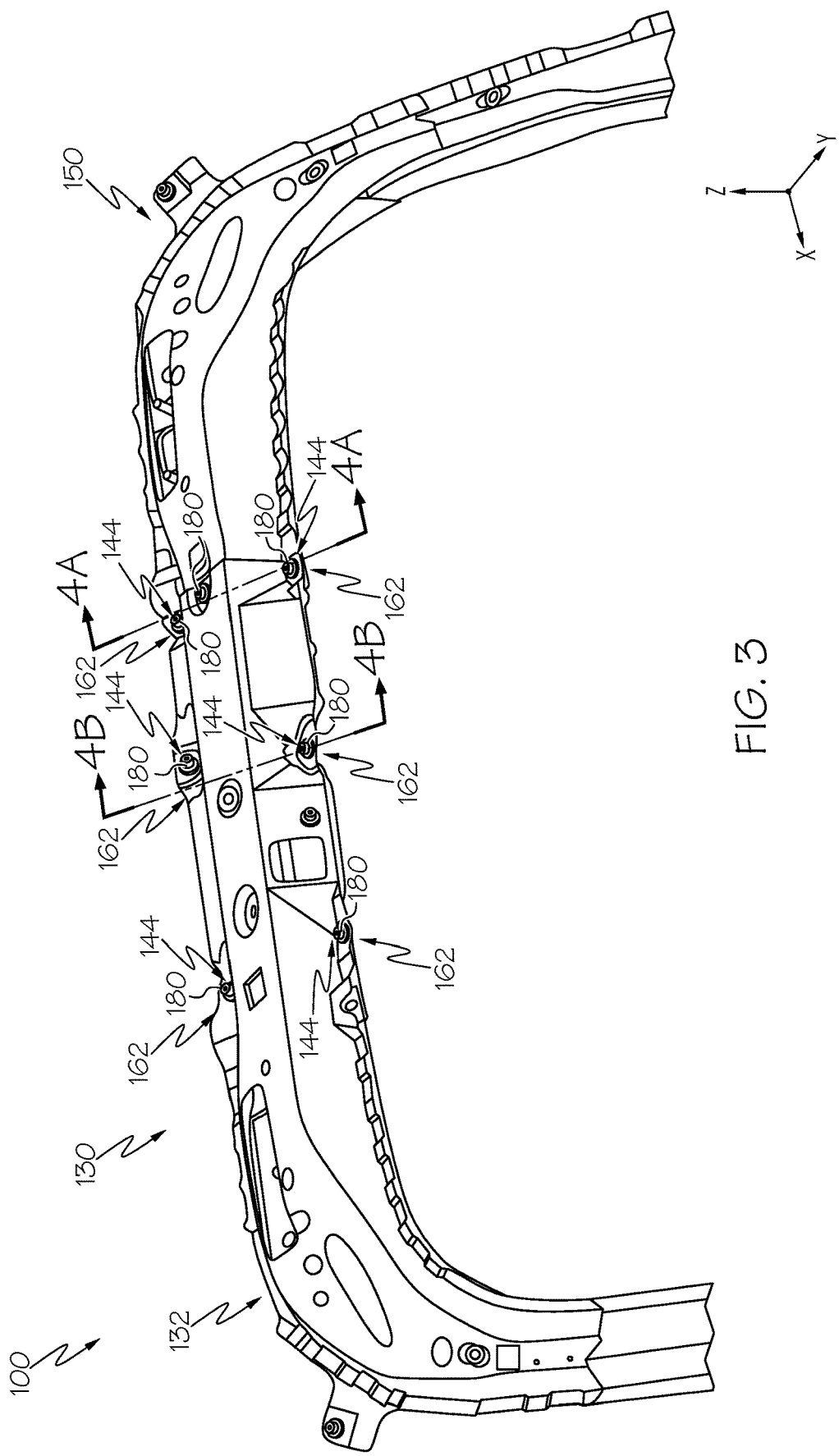
FIG. 3 schematically depicts a perspective view of the support assembly of FIG. 1 in isolation, according to one or more embodiments shown and described herein.
Figure 4B:
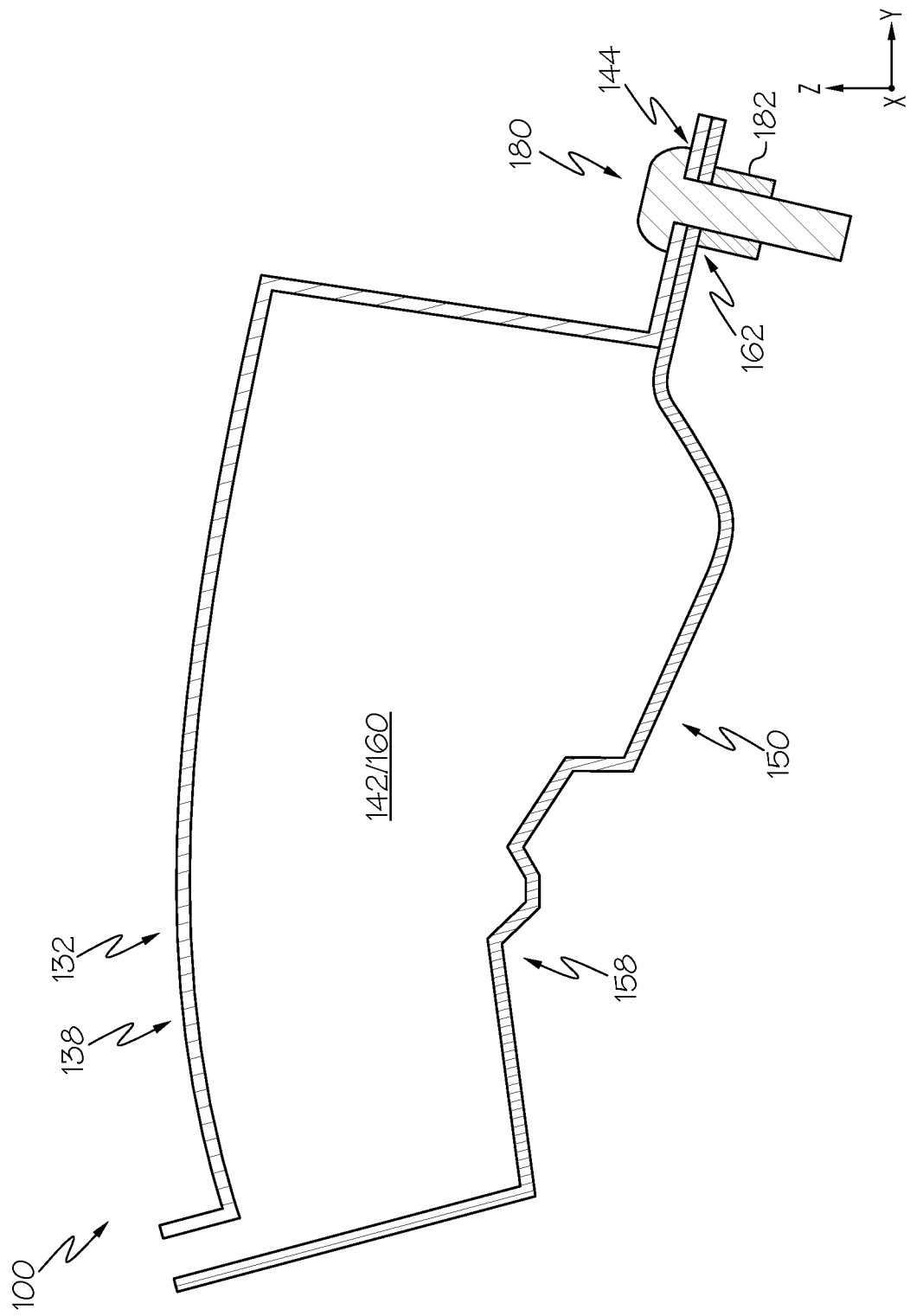
FIG. 4B schematically depicts a section view of the support assembly along section 4B-4B of FIG. 3, according to one or more embodiments shown and described herein.

Referring to FIGS. 3 and 4A, a perspective view of the support assembly 130 and a section view of the support assembly 130 along section 4A-4A of FIG. 3 are schematically depicted, respectively. As shown in FIG. 4A, when the first torsion member 132 is coupled to the second torsion member 150, the first inner cavity 142 and the second inner cavity 160 are in communication with one another. In embodiments, at least a portion of the first torsion member 132 overlaps the second torsion member 150. For example, at the location of the section 4A-4A in the depicted embodiment, the first outer member 138 of the first torsion member 132 overlaps the second outer member 156 and the second inner member 158 of the second torsion member 150. At other locations and as shown in FIG. 4B, which depicts a section view of the support assembly 130 along section 4B-4B of FIG. 3, the first outer member 138 of the first torsion member 132 is positioned over the second inner member 158 of the second torsion member 150, and does not overlap the second outer member 156 (FIG. 4A).

Referring collectively to FIGS. 4A and 4B, in embodiments, one or more fasteners 180 couple the first torsion member 132 to the second torsion member 150. More particularly, one or more fasteners 180 are positioned within holes of the plurality of holes 144 of the first torsion member 132, and through aligned and corresponding holes of the plurality of holes 162 of the second torsion member 150. In embodiments, the one or more fasteners 180 may include bolts, rivets, or the like that couple the first torsion member 132 to the second torsion member 150. In some embodiments, the one or more fasteners 180 may include bolts that are engaged with nuts 182 to secure the first torsion member 132 to the second torsion member 150.

Figure 4C:
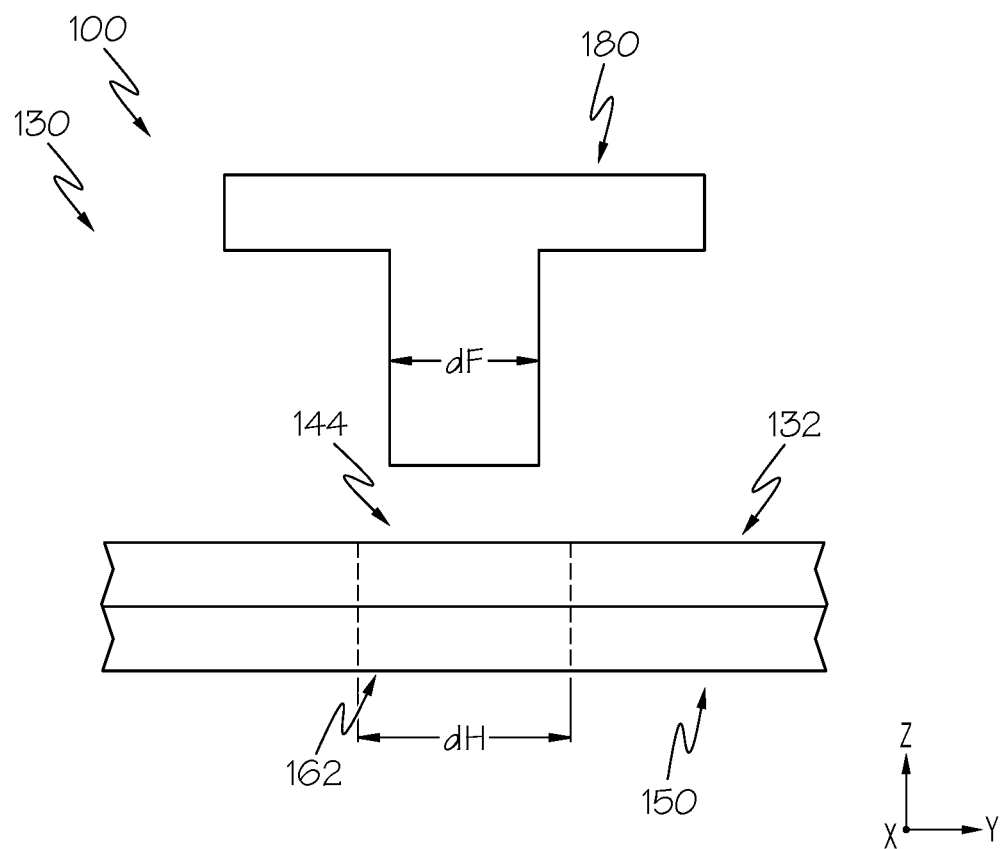
FIG. 4C schematically depicts an enlarged side view of aligned holes and a fastener of the support assembly of FIG. 4A, according to one or more embodiments shown and described herein.
Figure 4D:
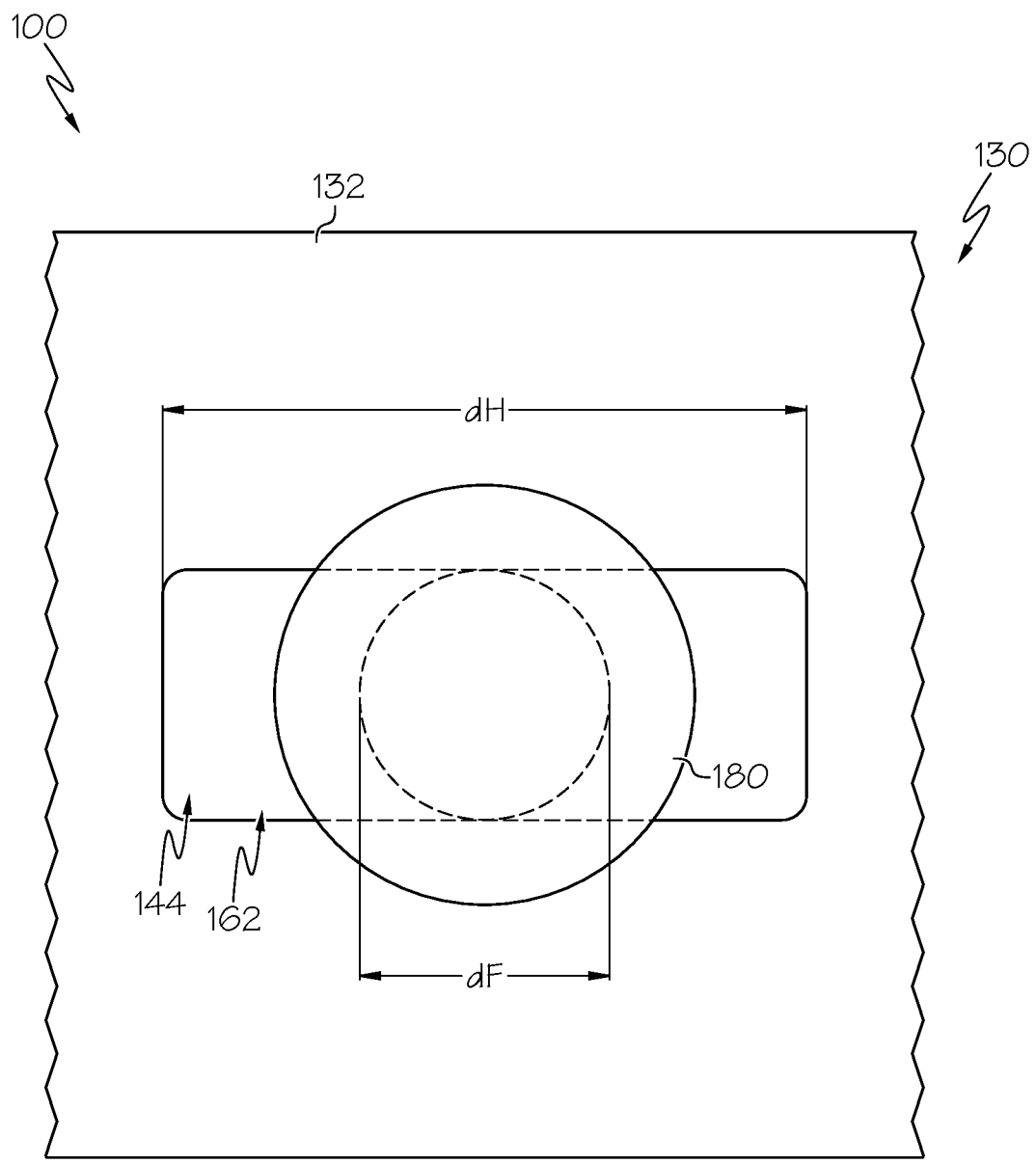
FIG. 4D schematically depicts an enlarged top view of the aligned holes and the fastener of FIG. 4B, according to one or more embodiments shown and described herein.

Referring to FIGS. 4C and 4D, an enlarged side view and top view of one of the one or more fasteners 180 positioned in one of the holes 144 of the first torsion member 132 and an aligned hole 162 of the second torsion member 150 are schematically depicted, respectively. In embodiments, each of the one or more fasteners 180 define a fastener span dF evaluated in the lateral direction. The hole 144 of the first torsion member 132 and/or the hole 162 of the second torsion member 150 define a span dH evaluated in the lateral direction, and in embodiments the span dH of the holes 144 and/or the holes 162 is greater than the fastener span dF. While in the embodiment depicted in FIGS. 4C and 4D, each of the holes 144, 162 include the same span dH, it should be understood that in some embodiments, the holes 144, 162 may include different spans evaluated in the lateral direction. In some embodiments, the span dH of the hole 144 of the first torsion member 132 and/or the hole 162 of the second torsion member 150 is at least 1.5 millimeters greater than the fastener span dF.

Because the span dH of the holes 144 and/or the holes 162 is greater than the fastener span dF, the first torsion member 132 and the second torsion member 150 may be movable with respect to one another in the lateral direction while still allowing the fastener 180 may be inserted within the holes 144, 162. For example, in embodiments in which the fastener 180 includes a bolt, the first torsion member 132 and the second torsion member 150 may be selectively movable with respect to one another in the lateral direction with the fastener 180 inserted within the holes 144, 162, before the fastener 180 is tightened to a corresponding nut 182 (FIGS. 4A, 4B). Because the first torsion member 132 and the second torsion member 150 are movable with respect to one another while still allowing the fastener 180 to be inserted within the holes 144, 162, a span of the support assembly 130 may be adjustable in the lateral direction when installed to the inner panel 110 (FIG. 1).

Methods for assembling the support assembly 130 to the inner panel 110 will now be described with reference to FIGS. 5-7.

Figure 5:
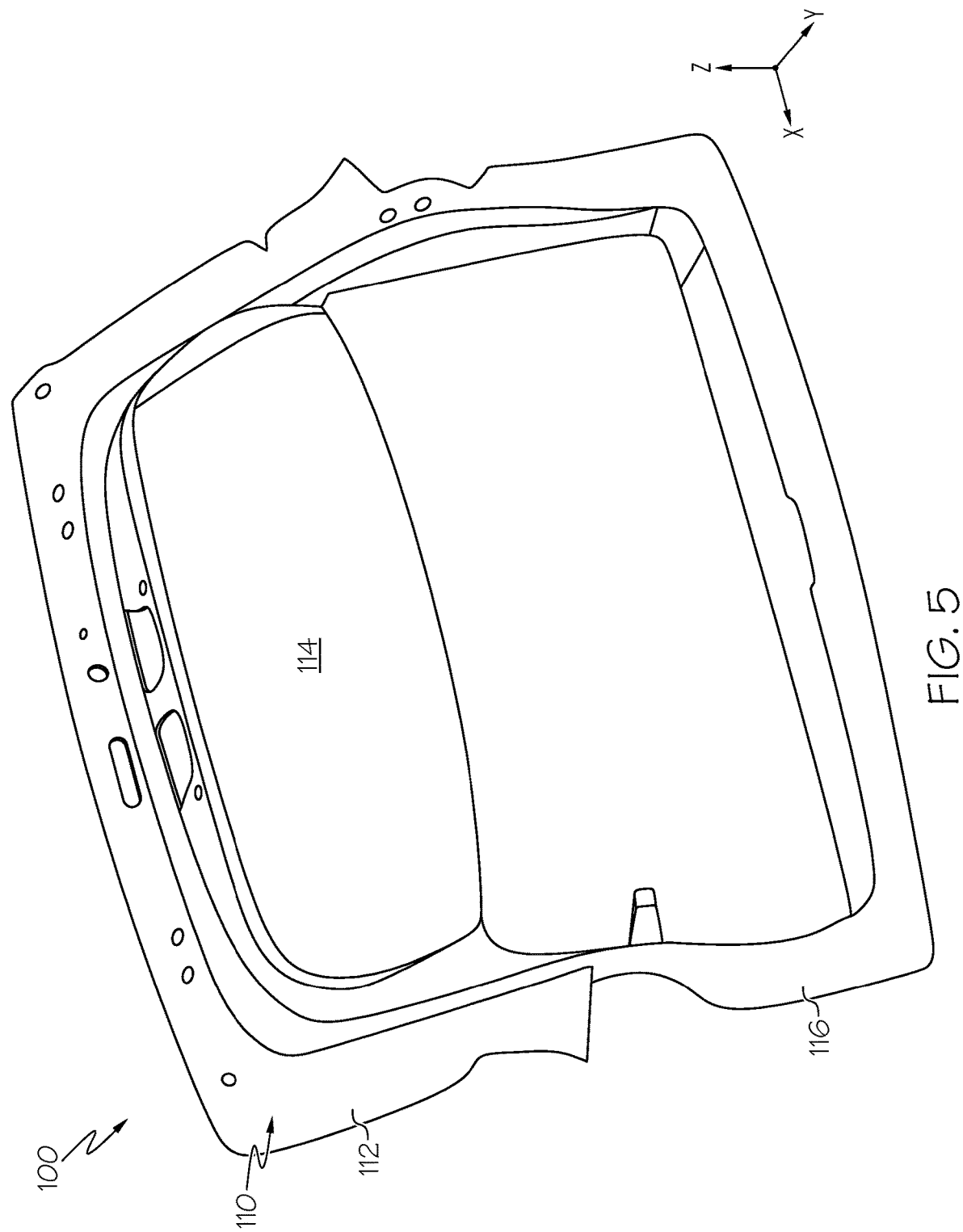
FIG. 5 schematically depicts the inner panel of the vehicle door of FIG. 1 in isolation, according to one or more embodiments shown and described herein.
Figure 6:
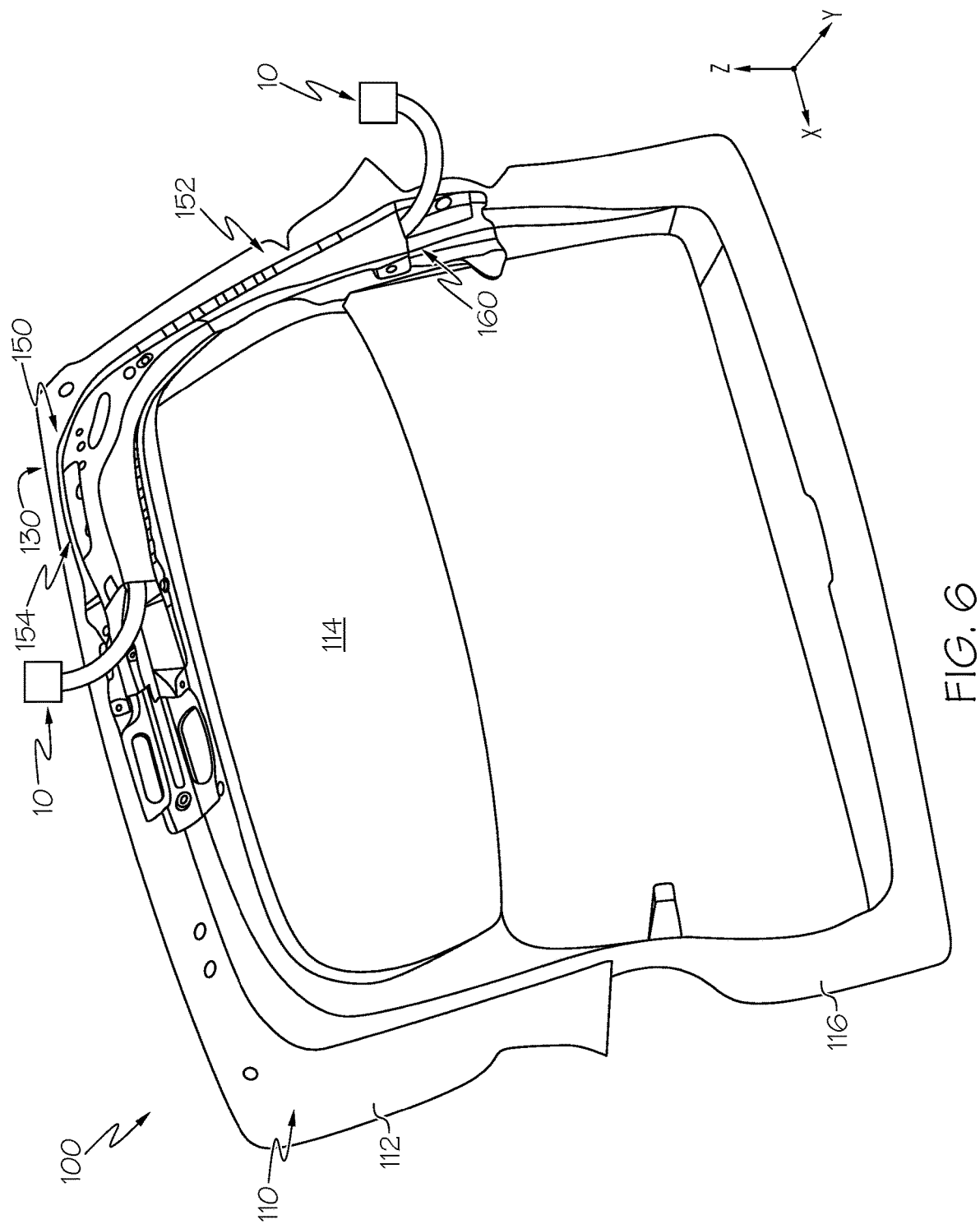
FIG. 6 schematically depicts the inner panel of FIG. 5 and a torsion member of the support assembly of FIG. 1, according to one or more embodiments shown and described herein.

Referring to FIGS. 5 and 6, one of the support members is initially positioned on the inner panel 110. In the embodiment depicted in FIG. 6, the second torsion member 150 is initially positioned on the inner panel 110, such that the second torsion member 150 extends along the upper portion 112 in the lateral direction. With the second torsion member 150 positioned on the inner panel 110, in some embodiments, an accessory wire 10 may be routed through the second inner cavity 160 of the second torsion member 150. The accessory wire 10 may be utilized to connect various electrical devices in the vehicle, for example, speakers, accessory lighting, or the like. To retain the position of the accessory wire 10, in some vehicle configurations, it is desirable to route the accessory wire 10 through structures such as the support assembly 130.

In embodiments, the accessory wire 10 may be routed through the second inner cavity 160 before the first torsion member 132 (FIG. 2) is coupled to the second torsion member 150, which may simplify the routing of the accessory wire 10 through the support assembly 130. For example, inner cavities of support assemblies may be generally difficult for a user to access. By routing the accessory wire 10 through the second inner cavity 160 before the first torsion member 132 (FIG. 2) is coupled to the second torsion member 150, as compared to routing the accessory wire 10 through the entire support assembly 130 when fully assembled (e.g., through both the first torsion member 132 and the second torsion member 150 simultaneously), the difficulty of routing the accessory wire 10 through the support assembly 130 may be reduced.

Referring to FIG. 7, with the second torsion member 150 positioned on the inner panel 110. The first torsion member 132 is positioned on the inner panel 110 opposite the second torsion member 150 in the lateral direction, such that the first torsion member 132 extends along the upper portion 112 of the inner panel 110 toward the second torsion member 150. The first torsion member 132 is positioned on the inner panel 110 such that the first inner cavity 142 (FIG. 4B) of the first torsion member 132 is aligned with the second inner cavity 160 (FIG. 4B) of the second torsion member 150 in the lateral direction, and such that the first inner cavity 142 and the second inner cavity 160 are in communication with one another.

As the first torsion member 132 is positioned on the inner panel 110, the plurality of holes 144 of the first torsion member 132 are aligned with the plurality of holes 162 of the second torsion member 150. With the plurality of holes 144 of the first torsion member 132 aligned with the plurality of holes 162 of the second torsion member 150, the one or more fasteners 180 are positioned within the plurality of holes 144 of the first torsion member 132 and through corresponding holes of the plurality of holes 162 of the second torsion member 150.

As noted above, the first torsion member 132 and the second torsion member 150 are movable with respect to one another in the lateral direction, for example, as a result of the span dH (FIG. 4D) of at least one of the holes 144, 162 being larger than the span dF (FIG. 4D) of the fasteners 180, as evaluated in the lateral direction. Accordingly, prior to securing the first torsion member 132 to the second torsion member 150, the first torsion member 132 and the second torsion member 150 may be moved in the lateral direction with respect to one another. More particularly, the first torsion member 132 and the second torsion member 150 may be moved with respect to one another in the lateral direction such that the first torsion member 132 and the second torsion member 150 are positioned within an envelope defined by the inner panel 110, the envelope extending between a perimeter of the inner panel 110 and the window aperture 114 of the inner panel 110. Because the first torsion member 132 and the second torsion member 150 are movable with respect to one another in the lateral direction, the span of the support assembly 130 evaluated in the lateral direction may be adjusted to accommodate variations of the envelope of the inner panel 110, such as may result from manufacturing tolerances.

Once the first torsion member 132 and the second torsion member 150 are positioned within the envelope defined by the inner panel 110, the fasteners 180 may secure the first torsion member 132 to the second torsion member 150, for example, by tightening the fasteners 180 to the nuts 182 (FIG. 4A). Once the first torsion member 132 and the second torsion member 150 are positioned within the envelope defined by the inner panel 110, the first and second torsion member 132, 150 may also be coupled to the inner panel 110. For example, in embodiments, the first and second torsion member 132, 150 may be coupled to the inner panel 110 in any suitable manner, for example, through mechanical fasteners, structural adhesives, welding, brazing, or the like.

It should now be understood that vehicle doors described herein generally include an inner panel and a support assembly including a first torsion member that is coupled to a second torsion member. The first torsion member and the second torsion member extend toward one another over an upper portion of the inner panel, and each of the first torsion member and the second torsion member define holes extending through the first torsion member and the second torsion member, respectively. In embodiments, at least one fastener is positioned within aligned holes of the first torsion member and the second torsion member to couple the first torsion member to the second torsion member. In embodiments, the holes of the first torsion member and/or the second torsion member are sized to allow lateral movement of the first torsion member with respect to the second torsion member, such that a span of the support assembly may be adjusted to accommodate variations in the size of the inner panel, for example as may result from manufacturing tolerances.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle door comprising:
   an inner panel comprising:
      an upper portion defining a window aperture; and
      a lower portion positioned opposite the upper portion in a vertical direction; and
   a support assembly coupled to the inner panel, the support assembly comprising:
      a first torsion member extending along the upper portion of the inner panel in a lateral direction that is transverse to the vertical direction, the first torsion member defining holes extending through the first torsion member;
      a second torsion member extending along the upper portion of the inner panel toward the first torsion member, the second torsion member defining holes that are aligned with the holes of the first torsion member; and
      at least one fastener positioned in corresponding aligned holes of the first torsion member and the second torsion member, the at least one fastener coupling the first torsion member to the second torsion member, and wherein the corresponding aligned holes and the at least one fastener are sized to selectively allow lateral movement of the first torsion member and the second torsion member with respect to one another in the lateral direction.

2. The vehicle door of claim 1, wherein the inner panel comprises a resin.

3. The vehicle door of claim 1, wherein the first torsion member comprises a first lateral portion extending in the lateral direction above the window aperture, and a first vertical portion extending downward in the vertical direction from the first lateral portion, wherein the first vertical portion extends across at least 25% of the inner panel evaluated in the vertical direction.

4. The vehicle door of claim 3, wherein the second torsion member comprises a second lateral portion extending in the lateral direction toward the first torsion member, and a second vertical portion extending downward from the second lateral portion in the vertical direction, wherein the second lateral portion is coupled to the first lateral portion of the first torsion member.

5. The vehicle door of claim 1, wherein the first torsion member comprises a first outer member and a first inner member positioned inboard of the first outer member, the first outer member and the first inner member defining a first inner cavity extending along the first torsion member.

6. The vehicle door of claim 5, wherein the second torsion member comprises a second outer member and a second inner member positioned inboard of the second outer member, the second outer member and the second inner member defining a second inner cavity extending along the second torsion member, wherein the first inner cavity and the second inner cavity are in communication with one another.

7. The vehicle door of claim 6, wherein the first outer member extends over the second inner member and overlaps at least a portion of the second outer member in the lateral direction.

8. The vehicle door of claim 1, wherein the at least one fastener defines a fastener span evaluated in the lateral direction, and the holes of at least one of the first torsion member or the second torsion member defines a span in the lateral direction that is at least 1.5 millimeters greater than the fastener span.

9. A method for assembling a vehicle door, the method comprising:
   positioning a second torsion member on an inner panel, the inner panel comprising an upper portion defining a window aperture and a lower portion positioned opposite the upper portion in a vertical direction, wherein the second torsion member extends along the upper portion in a lateral direction that is transverse to the vertical direction, and wherein the second torsion member comprises a second outer member and a second inner member coupled to and positioned inboard of the second outer member;
   positioning a first torsion member on the inner panel opposite the second torsion member in the lateral direction, wherein the first torsion member extends along the upper portion of the inner panel toward the second torsion member in the lateral direction wherein the first torsion member comprises a first outer member and a first inner member coupled to and positioned inboard of the first outer member;
   aligning a hole defined by the first torsion member with a hole defined by the second torsion member;

securing the first torsion member to the second torsion member with a fastener positioned through the hole of the first torsion member and the hole of the second torsion member; and prior to securing the first torsion member to the second torsion member, overlapping at least a portion of the first outer member over the second outer member.

10. The method of claim 9, further comprising coupling the first torsion member and the second torsion member to the inner panel.

11. The method of claim 10, further comprising, prior to securing the first torsion member to the second torsion member and prior to coupling the first torsion member and the second torsion member to the inner panel, moving one of the first torsion member or the second torsion member in the lateral direction with respect to the other of the first or the second torsion member such that the first torsion member and the second torsion member are positioned within an envelope defined by the inner panel, the envelope extending between a perimeter of the inner panel and the window aperture of the inner panel.

12. The method of claim 9, further comprising, prior to securing the first torsion member to the second torsion member, routing an accessory wire through an inner cavity defined by the second torsion member.

13. The method of claim 9, further comprising aligning a first inner cavity of the first torsion member with a second inner cavity of the second torsion member in the lateral direction, such that the first inner cavity and the second inner cavity are in communication with one another.

14. A vehicle door comprising:
an inner panel comprising:
an upper portion; and
a lower portion positioned opposite the upper portion in a vertical direction; and
a support assembly coupled to the inner panel, the support assembly comprising:
a pair of torsion members extending along the upper portion of the inner panel in a lateral direction that is transverse to the vertical direction, the pair of torsion members overlapping one another in the lateral direction and comprising aligned holes extending through each of the pair of torsion members; and
at least one fastener positioned in corresponding aligned holes of the pair of torsion members, wherein the aligned holes and the at least one fastener are sized to selectively allow lateral movement of the pair of torsion members with respect to one another in the lateral direction.

15. The vehicle door of claim 14, wherein the inner panel comprises a resin.

16. The vehicle door of claim 14, wherein each of the pair of torsion members comprise a lateral portion extending in the lateral direction, and a vertical portion extending downward in the vertical direction from the lateral portions, wherein the vertical portions of the pair of torsion members extend across at least 25% of the inner panel evaluated in the vertical direction.

17. The vehicle door of claim 16, wherein the upper portion of the inner panel defines a window aperture extending through the inner panel, and wherein the lateral portion of each of the pair of torsion members is positioned above the window aperture.

18. The vehicle door of claim 14, wherein each of the pair of torsion members comprise an outer member and an inner member positioned inboard of the outer member, the outer members and the inner members defining inner cavities extending along each of the pair of torsion members.

19. The vehicle door of claim 14, wherein the at least one fastener defines a fastener span evaluated in the lateral direction, and the holes of at least one of the pair of torsion members defines a span evaluated in the lateral direction that is at least 1.5 millimeters greater than the fastener span.

* * * * *